2,814,373
SYNCHRONIZER

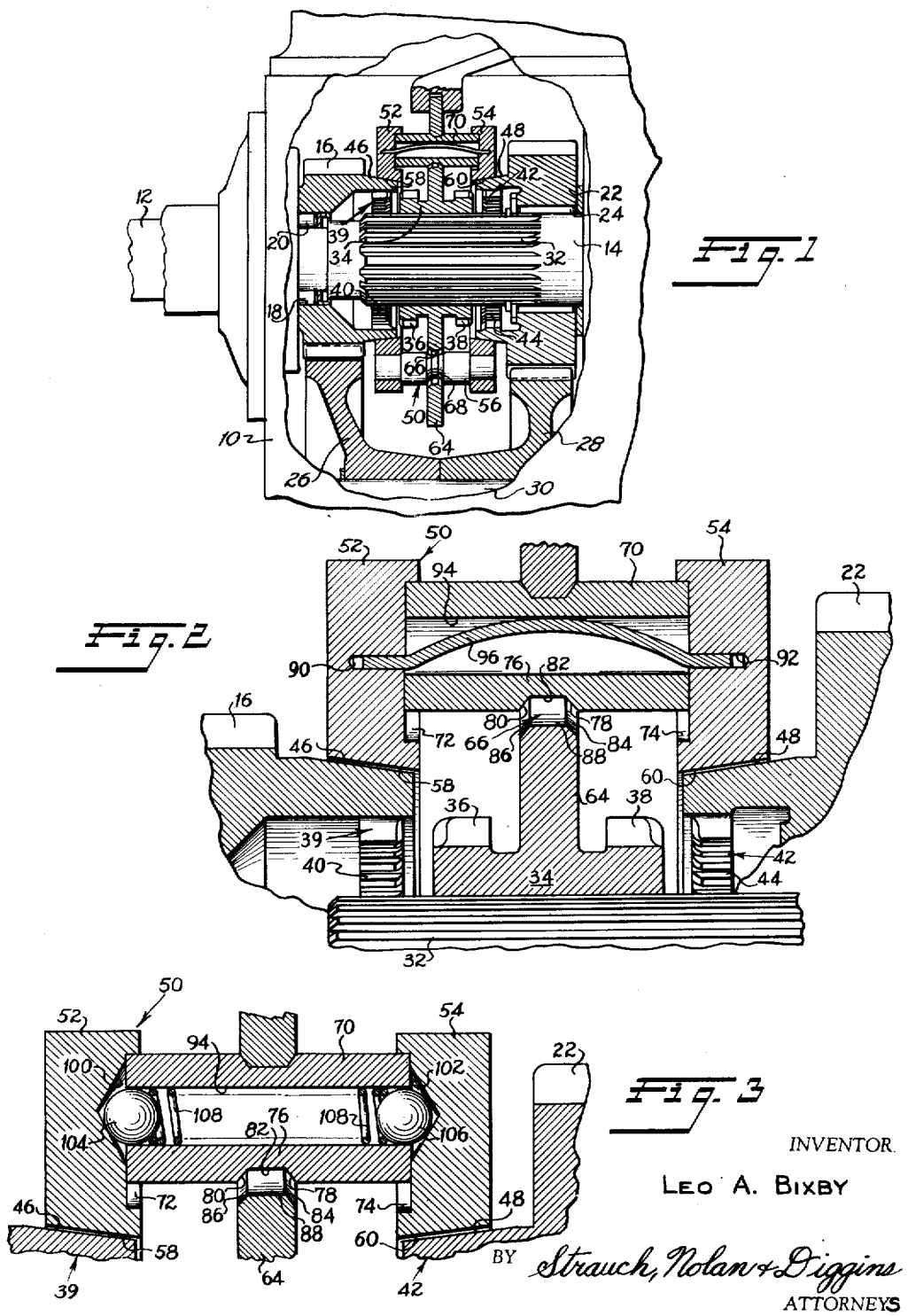

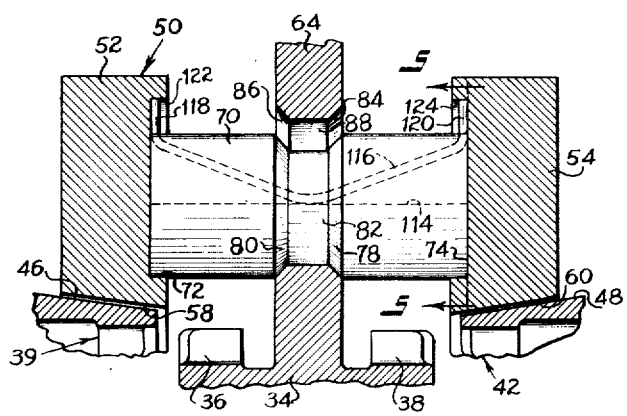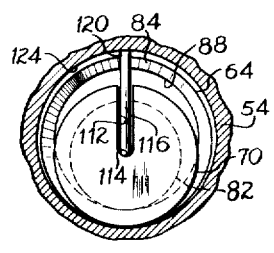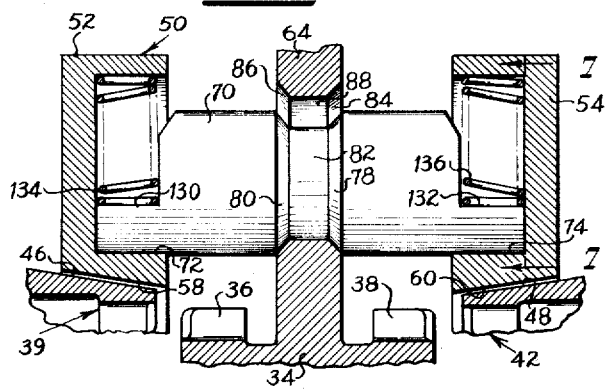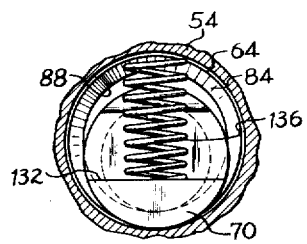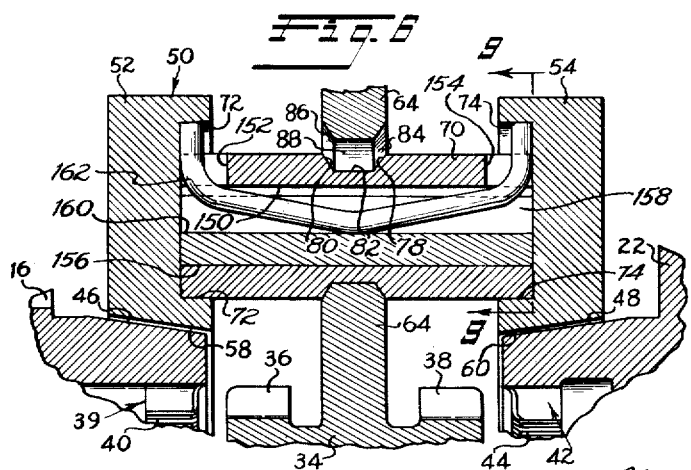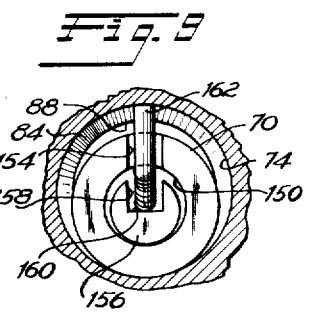
INVENTOR
LEO A. BIXBY
BY Strauch, Nolan & Diggins
ATTORNEYS

United States Patent Office 2,814,373
Patented Nov. 26, 1957

Leo A. Bixby, Niles, Mich., assignor, by mesne assignments, to Rockwell Spring and Axle Company, Coraopolis, Pa., a corporation of Pennsylvania Application August 21, 1952, Serial No. 305,637

21 Claims. (Cl. 192—53)

This invention relates to improvements in synchronizing clutch mechanisms for power transmission gear assemblies and more particularly to improvements in thrust pin resilient coupling arrangements of such mechanisms. The present invention provides a simple effective mechanism for synchronizing relatively moving parts for quickly and quietly changing speeds or gear ratios of power transmission gear drive assemblies and in which the thrust pin resilient coupling arrangement lends itself to simple fast methods of manufacture and produces longer life for the components of the synchronizing mechanism due to the incorporation therein of certain novel protective features which hereinafter will become more fully apparent.

In the past, various forms of resilient coupling arrangements have been provided for the thrust members of synchronizing mechanisms as is apparent by reference to United States Letters Patent No. 1,913,162, issued June 6, 1933, to H. L. Keller for Synchro-Mesh Transmission; Patent No. 2,060,971, issued November 17, 1936, to R. Beringer for Synchronizing Clutch Mechanism; Patent No. 2,179,568, issued to S. O. White on November 14, 1939, for Transmission Synchronizer, Patent No. 2,221,893, issued November 19, 1940, to S. O. White for Transmission Synchronizer, and Patent No. 2,221,899, issued November 19, 1940, to S. O. White et al. for Blocker Synchronizer.

The primary object of my invention is to provide an improved mechanism for synchronizing relatively rotating transmission parts to facilitate quick quiet intermeshing of positive or toothed clutch elements associated with such parts resulting in a simpler, more compact and less expensive transmission synchronizing arrangement.

A further object of my invention is to provide, in a synchronizing mechanism of a power transmission assembly, a thrust pin resilient coupling arrangement of such improved construction that, if the resilient members of such coupling arrangement are broken during operation, there is no possibility of further damage to the assembly by the entry of the broken parts of such resilient members into the relatively moving parts thereof.

A further and more specific object of my invention is to provide an improved synchronizing mechanism for power transmission assemblies in which the thrust pins and movable friction clutch element of the synchronizing mechanism so contain the respective transverse force spring or resilient means that, if such means is broken, the resulting spring segments or debris will not enter, and thereby, damage or break the expensive components of the synchronizing mechanism and the power transmission assembly.

These and other objects of my invention will become more fully apparent from the following detailed description when considered in connection with the appended claims and the accompanying drawings wherein:

Figure 1 is a side elevation view partially cut away and in section showing a preferred embodiment of my invention in a gear box of an automotive transmission;

Figure 2 is an enlarged fragmentary sectional view of the thrust pin resilient coupling arrangement of the synchronizing mechanism of Figure 1;

Figure 3 is a view similar to Figure 2 illustrating an alternate preferred form of my invention;

Figure 4 is a view similar to Figure 2 illustrating a third embodiment of my invention;

Figure 5 is a fragmentary sectional view taken along the line 5—5 of Figure 4;

Figure 6 is a fragmentary sectional view similar to Figure 2 illustrating another type of floating thrust pin resilient coupling arrangement constituting a fourth embodiment of my invention;

Figure 7 is a fragmentary sectional view of the fourth embodiment of my invention taken along the line 7—7 of Figure 6.

Figure 8 is a fragmentary sectional view similar to Figure 2 illustrating a fifth embodiment of my invention; and Figure 9 is a fragmentary sectional view of the embodiment of my invention taken along the line 9—9 of Figure 8.

The relation of a preferred embodiment of my improved synchronizing mechanism to the gear box components of a power transmission mechanism such as that found in automotive applications is shown in Figure 1. In such applications, the power transmission mechanism is housed within a casing 10 in which are coaxially journalled a power input or engine driven shaft 12 and a power output shaft 14. A gear 16, which is fixed for rotation with the engine driven power input shaft 12, is formed with a recess 18 in which the forward extremity of the shaft 14 is journalled by an anti-friction bearing 20. A second gear 22 is journalled for rotation by an anti-friction bearing 24 on, but independently of, the shaft 14 in coaxial alignment with the gear 16. Power is transmitted between gears 16 and 22 by a pair of gears 26 and 28 which are respectively in constant mesh with gears 16 and 22 and which are mounted for concomitant rotation upon a counter shaft 30.

The power output shaft 14 is formed with an externally splined portion 32 upon which is non-rotatably but axially slidably mounted a double ended positive clutch element 34. Clutch element 34 at its opposite axial ends is provided with annular rows of external clutch teeth 36 and 38. Gear 16 is provided with a positive clutch element 39 formed by an internal annular row of clutch teeth 40 with which the annular row of clutch teeth 36 may be engaged by axial movement of the clutch element 34 toward the gear 16 to establish a positive drive connection between input shaft 12 and the output shaft 14.

A similar positive clutch element 42 which is formed by an internal annular row of clutch teeth 44 is provided upon gear 22. By axial movement of positive clutch element 34 toward gear 22, clutch teeth 38 may be similarly engaged with clutch teeth 44 to establish a positive drive connection between gear 22 and the output shaft 14. It is thus seen that positive clutch elements 39 and 42 are mounted for coaxial rotation about the common axis of shafts 12 and 14 in fixed axially spaced relation, that each is rotatable independently of shaft 14, and that the positive clutch element 34 which is complementary to clutch elements 39 and 42 can be shifted axially of shaft 14 to establish a positive drive between shaft 14 and either positive clutch element 39 or positive clutch element 42.

In order that the positive clutch elements 39 and 42 can be synchronized with the rotation of shaft 14 prior to the establishment of a positive drive therebetween by the engagement of the clutch element 34 therewith, frictional clutch elements 46 and 48, in the form of external conical surfaces, are provided in fixed relation to the positive clutch elements 39 and 42 respectively. A double ended complementary frictional clutch element 50, which is formed by a pair of spaced annular members 52 and 54 substantially coaxial with the axis of rotation of shafts 12 and 14 and held in rigidly correlative fixed spaced relation axially by a plurality of symmetrically disposed solid pins 56 extending therebetween and fixed at their ends thereto, is disposed intermediate frictional clutch elements 46 and 48 and axially shiftable for engagement with either. Annular members 52 and 54 are formed respectively with conical surfaces 58 and 60 adapted for frictional driving engagement with the conical surface of frictional clutch elements 46 or 48 upon axial movement of frictional clutch element 50 toward gears 16 or 22.

Complementary friction clutch element 50 is so coupled to the complementary positive clutch element 34 that, upon initial axial displacement of the positive clutch element 34 in either direction, complementary frictional clutch element 50 will move axially conjointly therewith to establish a frictional drive through frictional clutch element 46 or 48 to the axially fixed positive clutch element 39 or 42 to be engaged by positive clutch element 34 and effect synchronization in rotation therebetween. After such initial conjoint displacement of complementary clutch elements 34 and 50, upon further axial displacement of positive complementary clutch element 34, due to the resiliency of the coupling between these complementary clutch elements, relative displacement between such complementary clutch elements can occur to permit positive driving engagement of the positive clutch elements after synchronization has been effected.

Complementary positive clutch element 34 is provided with a radially extending flange portion 64 through which are formed a plurality of symmetrically disposed apertures or openings 66, the axes of which are parallel to the axis of rotation of complementary clutch element 34. The solid pins 56 which hold the annular members 52 and 54 in rigidly spaced relationship extend through alternate ones of these apertures 66 and are each formed with a central portion 68 of reduced cross sectional dimension relative to the size of the openings 66 to permit limited relative rotation between the complementary clutch elements 34 and 50 upon initial engagement of clutch element 34 with clutch element 46 or 48. Both the openings 66 and the central portion 68 of pins 56 have a central cylindrical surface and, at each end, a truncated conical surface which coact, after such relative rotation between clutch elements 34 and 50, as thrust or checking surfaces to permit transmission of axial thrust force from clutch element 34 to provide the necessary axial engaging force upon the frictional clutch elements to effect synchronization.

Through each of the openings intermediate such alternate openngs through which the solid pins 56 extend is provided a floating thrust pin 70. Each pin 70 extends and is axially restrained between the annular members 52 and 54 but is free to move through a limited transverse path. The structure, mounting, and mode of coupling of these floating thrust pins 70 upon the positive and frictional complementary elements 34 and 50 is best illustrated in the enlarged view in Figure 2.

As is shown in Figure 2 the opposite ends of the pins 70 are received within and abut in sliding engagement against the end walls of recesses 72 and 74 which are larger than the cross-sectional dimension of the ends of the pins 70 to permit limited transverse movement of the pins 70 relative to the annular members 52 and 54. Centrally of their lengths, pins 70 are each formed with a portion 76 of reduced cross-sectional dimension having inclined side walls 78 and 80 and an externally cylindrical bottom wall 82 which define checking or detent surfaces for engagement respectively with the surfaces 84, 86 and 88 of the intermediate ones of the apertures 66 through the flange portion 64, previously referred to. The cross-sectional dimension of the reduced portions 76, defined by the cylindrical surface 82, is sufficiently smaller than the cross-sectional dimension of these intermediate apertures defined by the internal cylindrical surface 88 to permit transverse displacement of the pins 70 when the surfaces 78, 80 and 82 of the reduced portions 76 are aligned with the surfaces 84, 86, and 88 of the apertures 66 through which the pins 70 extend. The cross-sectional dimension of the pins 70 between their ends and their reduced portions 76 is substantially that of the cylindrical surfaces 88 so that, when pins 70 are coaxially aligned with the cylindrical surfaces 88, sliding fits are established between pins 70 and the surfaces 88 during relative axial displacement of the complementary clutch members 34 and 50.

The pins 70 are resiliently biased from coaxial alignment with the cylindrical surfaces 88 to positions such as that illustrated in which the surfaces 78, 80 and 82 of the reduced portions 76 of the pins 70 engage the surfaces 84, 86 and 88 of the aperture through which the pins 70 extend. In each of the disclosed embodiments of this invention, the thrust pins 70 are resiliently biased to such a position by resilient biasing means reacting between opposed reaction surfaces formed upon the annular members 52 and 54 of the complementary frictional clutch element 50 and on the pins 70. In the embodiment shown in Figure 2, the reaction surfaces on the complementary frictional clutch element 50 are formed by the walls of recesses 90 and 92 formed respectively in the end walls of the recesses 72 and 74 of the annular members 52 and 54, while the reaction surfaces upon the pins 70 are defined by the wall of an opening 94 formed coaxially through each of the pins 70. The resilient biasing means for each pin 70 is a bowed spring member 96 received at its ends within the recesses 90 and 92 and which centrally abuts against the wall 94 midway of its length axially of pins 70.

By this construction, when the positive complementary clutch element 34 is in its central or neutral position as illustrated, the equiangularly disposed outwardly biased thrust pins 70 support the complementary frictional clutch element 50 in substantially coaxial alignment with the complementary positive clutch element 34 and resiliently hold frictional clutch element 50 in an axially fixed position relative to positive clutch element 34. When the positive clutch element 34 is moved toward the positive clutch element 39, limited conjoint axial movement of clutch elements 34 and 50 occurs until the conical surface 58 engages the conical surface of the axially fixed frictional clutch element 46 at which time, due to the lack of synchronization between the speeds of rotation of positive clutch elements 34 and 39, limited relative rotation between complementary clutch elements 34 and 50 will occur as previously described. It will be noted that the axial frictional clutch element engaging force during synchronization is transmitted from clutch element 34 to clutch element 50 by both the solid pins 56 and the thrust pins 70. After synchronization in the speed of rotation of positive clutch elements 34 and 39 has been established, the positive clutch element 34 can be moved further axially to engage the annular row of external clutch teeth 36 with the annular row of internal clutch teeth 40 to establish a positive drive connection between positive clutch elements 34 and 39. During such further movement of the positive clutch element 34, the inclination of the mating surfaces 80 and 86 causes the pins 70 to cam from their illustrated positions to positions coaxial with the cylindrical surfaces 88 in opposition to the biasing force exerted by the spring means 96 and the centrifugal force upon the pins 70 resulting from rotaiton of clutch element 34. After the pins 70 have been cammed into such coaxial positions, further movement of positive complementary clutch element 34 causes sliding engagement between the pins 70 and the cylindrical surfaces 88. Since the mode of operation during the engagement of clutch element 34 with the clutch element 42 is the same as that described above for the engagement of clutch element 34 with clutch element 39, a detailed explanation of that operation is not deemed to be necessary.

It will be noted that the resilient biasing means for the pins 70, that is the spring member 96, is so located that, if during operation it should be broken, the parts thereof will not fall into the gearing or mating clutch elements and produce damage to these parts which are relatively expensive to manufacture. In this preferred embodiment of the invention shown in Figure 2, this improved result is accomplished by containing the resilient biasing means within the pin itself and between the annular members 52 and 54 and the ends of the pin so that, should the spring member 96 break, there is no possibility of the parts thereof moving into the mating clutch elements or into the gearing of the power transmission mechanism.

Figure 3 shows an alternative preferred embodiment of my invention which differs from that of Figure 2 in the nature and location of the opposed reaction surfaces and the resilient biasing spring member. In the embodiment shown in Figure 3, conical reaction surfaces 100 and 102 are formed in the end wall of recesses 72 and 74 respectively in general alignment with the axis of the pins 70 when they are located in their displaced positions relative to the axes of the cylindrical surfaces 88 on the flange 64 of the complementary positive clutch element 34. Balls 104 and 106, which are approximately the same diameter as and are mounted within the opposite ends of each of the through openings 94 of the pins 70, are biased outwardly of opening 94 by coil type springs 108 mounted within each of the openings 94 in compressed condition therebetween. Balls 104 and 106 are biased against the conical walls of the recesses 100 and 102 respectively, the reaction force against balls 104 and 106 thus tending to bias the pins 70 radially outward relative to the axis of rotation of the positive clutch element 34 to engage, in the central or neutral position of element 34, the surfaces 78, 80 and 82 of pins 70 with surfaces 84, 86 and 88 respectively.

The mode of operation of this second and alternative preferred embodiment of my invention is substantially the same as that of the first embodiment of my invention shown in Figure 2, that is initial axial movement of the complementary positive clutch element 34 produces conjoint axial displacement of the complementary frictional clutch element 50 to engage the frictional clutch elements to effect synchronization of the positive clutch elements, and further axial displacement of the complementary positive clutch element 34 cams the pins 70 to positions coaxial with the cylindrical surfaces 88 of their respective openings 66 through the flanged portions 64 of complementary positive clutch element 34 and effects engagement of the positive clutch elements to establish a positive drive connection between the complementary positive clutch element 34 and axially fixed positive clutch element 39 or 42 depending upon the direction of axial displacement thereof.

In this second alternative embodiment, the spring member 108 is also enclosed within the through opening 94 of the pins 70 and the balls 104 and 106 are retained within the opening 94 by the annular members 52 and 54 so that, in the event that the resilient spring member 108 should become broken, neither the parts thereof nor the balls 104 or 108 can move to positions where damage to the clutch elements or the gearing could occur.

The third embodiment of my invention is shown in Figures 4 and 5. This embodiment differs from the previous embodiments in that a longitudinal slot 112 having a bottom wall 114 is provided in lieu of the longitudinally extending opening 94 (Figures 1 through 3) and in that each of the thrust pins 70 is resiliently biased from coaxial alignment with the cylindrical surfaces 88 by a spring member 116 of generally U-shaped longitudinal configuration as best shown in Figure 4 which abuts at its ends 118 and 120 against the side walls 122 and 124 of the recesses 72 and 74 respectively and at its midpoint intermediate the ends 118 and 120 against the bottom wall 114 of the longitudinal slot 112. The opposed reaction surfaces in this embodiment of my invention are the side walls 122 and 124 of the recesses 72 and 74 and the bottom wall 114 of the slot 112. The thrust pins in this embodiment are illustrated as biased toward the axis of rotation of clutch element 34 in operation due to the centrifugal force acting on these pins 70, they will rotate to a position in which they are biased radially outward relative to the axis of rotation of clutch element 34. The operation of this form of the invention is the same as that of the previous embodiments.

The fourth embodiment of my invention is shown in Figures 6 and 7. This embodiment of my invention differs from the previous embodiments in that transverse cuts are made across the ends of the pins 70 to provide planar reaction surfaces 130 and 132 thereon which are parallel to the axis of the pins 70, in that the recesses 72 and 74 are deeper than those of the previous embodiments and the pins 70 correspondingly longer, and in the provision of compressed coil springs 134 and 136 as the resilient biasing spring members. As in the third embodiment, the pins 70 in the fourth embodiment are illustrated as biased radially toward the axis of rotation of the complementary positive clutch element 34 but in operation will assume a position in which they are biased radially outward relative to the axis of rotation of clutch element 34. Springs 134 and 136 are respectively compressed between the planar reaction surface 130 on each of the pins 70 and the cylindrical side wall of the associated recess 72 and between the planar reaction surface 132 on each of the pins 70 and the cylindrical side wall of the side wall of the associated recess 74. The mode of operation of this fourth embodiment of my invention is the same as that of the previous embodiments.

A fifth embodiment of my invention is illustrated in Figures 8 and 9. As is illustrated in Figure 8, the thrust pins 70 are each formed with a longitudinal coaxial bore 150 and at their opposite ends with radial notches 152 and 154. A cylindrical pin 156 formed with a longitudinal slot 158 having a bottom wall 160 (best illustrated in Figure 9) is disposed within the bore 150 of each of the pins 70. A spring member 162 which is of a generally U-shaped longitudinal configuration extends through the bore 150 of each pin 70, resting on the longitudinal slot 158 of the internal pin 156 and abutting against the bottom wall of slot 158 centrally of its length as is shown in Figure 8. At its opposite ends, spring member 162 projects through slots 152 and 154 respectively and abuts against the cylindrical side wall of recesses 72 and 74 respectively. Each spring member 162 biases the associated pin from axial alignment with the associated cylindrical surface 88 in the same manner as in previous embodiments. This embodiment is quite similar to the embodiment of Figures 4 and 5 but is an improvement over that embodiment in that the danger of fragments of a broken spring member 162 moving in to a position to damage the other components of the assembly is further reduced.

While my present invention has been illustrated in an automotive transmission, it is apparent that it may be used in any gear train for drive coupling relatively rotating parts, being of particular utility also in two speed transfer cases of multiple drive axle vehicles.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a shaft and a pair of axially fixed independently rotatable gears coaxial therewith, means for clutching either of said gears to said shaft comprising toothed clutch elements fixed coaxially upon the adjacent faces of said gears, a complementary toothed clutch element non-rotatably mounted upon said shaft intermediate said gears for axial movement therealong into positive driving engagement with the toothed clutch element on either of said gears, means providing frictional clutch surfaces upon adjacent faces of said gears, a frictional clutch element supported by said complementary toothed clutch element and having complementary frictional clutch surfaces engageable with the frictional clutch surfaces of said gears during engaging movement of said complementary toothed clutch element to effect synchronization between said toothed clutch elements prior to their engagement, a plurality of symmetrically disposed rigid thrust pins so connected to said frictional clutch element as to be axially fixed relative to said frictional clutch element, axially displaceable relative to said complementary toothed clutch element and transversely displaceable relative to both through limited paths, resilient means reacting between said frictional clutch element and each of said rigid pins for transversely biasing said pins toward one extremity of their transverse paths of movement, and means operative while said pins are transversely displaced to said one end of their paths for coupling said frictional and complementary toothed clutch elements for conjoint axial movement, and means for axially shifting said complementary toothed clutch element axially of said shaft for engagement to establish a drive connection between said shaft and either of said gears.

2. In a power transmission mechanism, a shaft, a pair of axially spaced positive clutch elements coaxially rotatable independently of and axially fixed relative to said shaft, a complementary positive clutch element rotatably fixed upon and axially shiftable relative to said shaft intermediate said pair of axially fixed positive clutch elements and having a central radially extending flange formed with a plurality of symmetrically arranged through apertures, a frictional clutch element fixed upon each of said positive clutch elements, a complementary frictional clutch member coaxially disposed relative to said complementary positive clutch element on each side of said flange, a first set of rigid pins extending through alternate ones of said apertures rigidly connecting said clutch members in axially spaced relation, a thrust pin disposed between each pair of adjacent pins of said series and extending through the other ones of said apertures parallel to the axis of said shaft and mounted for axial displacement with and transverse displacement relative to said pair of complementary frictional clutch members, means including at least one resilient element associated with each of said thrust pins and so resiliently coupling said thrust pins to said axially shiftable positive clutch element that initial axial displacement of said axially shiftable positive clutch element will produce conjoint axial displacement of said pins and said pair of spaced complementary frictional clutch members into engagement with one of said axially fixed frictional clutch elements and further axial displacement of said axially shiftable positive clutch element will produce transverse displacement of said thrust pins to permit relative axial movement between said axially shiftable clutch element and said pair of spaced complementary frictional clutch elements to permit engagement of said axially shiftable positive clutch element with one of said axially fixed positive clutch elements associated with said one axially fixed frictional clutch element, and means so isolating said resilient elements from said clutch elements as to prevent damage to said clutch elements in the event of breakage of any of said resilient elements.

3. In a power transmission mechanism, a shaft, a pair of axially spaced positive clutch elements coaxially rotatable independently of and axially fixed relative to said shaft, a complementary positive clutch element rotatably fixed upon and axially shiftable relative to said shaft intermediate said pair of axially fixed positive clutch elements and having a central radially extending flange formed with a plurality of symmetrically arranged through apertures, a frictional clutch element fixed upon each of said pair of positive clutch elements, a frictional clutch member complementary to each of said fixed frictional clutch elements coaxially disposed relative to said complementary positive clutch element on each side of said flange, a first set of rigid pins extending through alternate ones of said apertures rigidly connecting said clutch members in axially spaced relation, each pin of said series having such a cross-sectional configuration over the major portion of its length as to provide a sliding fit with the associated aperture and a central portion of reduced cross-section to permit limited relative rotational displacement between said complementary positive clutch element and said frictional clutch members upon initial engagement of one of said clutch members with the associated fixed frictional clutch element and to provide opposed thrust surfaces between said complementary positive clutch element and the pins of said series during such rotational displacement to transmit clutch engaging force to the engaged frictional clutch element and member to effect synchronization, a thrust pin disposed between each pair of adjacent pins of said series and extending through the other ones of said apertures parallel to the axis of said shaft, said thrust pins each abutting said clutch members at its ends, being transversely displaceable relative thereto, having such a cross-sectional configuration over the major portion of their lengths as to provide a sliding fit with the associated aperture and a central portion of reduced cross-section to permit limited displacement of said thrust pins relative to said complementary positive clutch element to provide opposed thrust surfaces between said complementary positive clutch element and said thrust pins, and means including at least one resilient element associated with each of said thrust pins and resiliently biasing each of said thrust pins to such displaced position whereby initial clutch engaging movement of said complementary positive clutch element will, due to the engagement of said thrust pins therewith, produce conjoint axial displacement of said clutch members, initial engagement of one of said frictional clutch elements by the complementary frictional clutch member will produce relative rotational displacement between said complementary positive clutch element and said clutch members to engage the thrust surfaces of said series of pins to supplement the thrust transmitting action of said thrust pins, and further axial displacement of said complementary positive clutch element will effect positive clutch engagement after synchronization, and means so isolating said resilient elements from said clutch elements and member as to prevent damage to said clutch elements and member in the event of breakage of any of said resilient elements.

4. In a synchronizing clutch assembly, a first and rotatably mounted axially fixed component including rigidly connected coaxial positive and frictional clutch elements, a second and axially shiftable complementary clutch component mounted for rotation coaxial with said first clutch component and including relatively axially movable positive and frictional clutch elements, a rigid thrust member extending between the clutch elements of said second clutch component and so connected thereto as to be axially fixed relative to said frictional clutch element, axially displaceable relative to said positive clutch element, and transversely displaceable relative to both through a limited path, resilient means reactively interposed between said frictional clutch element and said thrust member to transversely bias said thrust member toward one extremity of such path, and means operative while said thrust member is transversely displaced to said one end of its path for coupling said clutch elements of said second clutch component for conjoint axial movement, and means operatively connected to the positive clutch element of said second clutch component for axially shifting said second clutch component relative to said first clutch component, whereby initial engaging movement of said second clutch component will engage said frictional clutch elements to effect synchronization thereof and further engaging movement will engage said positive clutch elements.

5. In a power transmission mechanism, a shaft, a positive clutch element coaxially rotatable independently of and axially fixed relative to said shaft, a second and complementary positive clutch element rotatably fixed and axially shiftable relative to said shaft for engagement with said first positive clutch element, a first frictional clutch element fixed to said first positive clutch element, a second and complementary frictional clutch element, said second positive clutch element being formed with a plurality of openings symmetrically disposed about the axis of said shaft and having their axes parallel to that of said shaft, the adjacent face of said second frictional clutch element being formed with a like plurality of recesses in general alignment with said openings, and means resiliently supporting said second frictional clutch element upon said second positive clutch element for limited movement relative thereto, said means comprising a plurality of pins extending through one of said openings and having an end smaller than said recesses received in one of said recesses for limited movement therein, said pins being of such cross-sectional configuration as to have a sliding fit with said openings over a portion of their length and a portion of reduced cross-sectional dimension which, when longitudinally aligned with said openings, permits limited transverse movement of said pins relative to said second positive clutch element, and resilient means operably interposed between said second frictional clutch element and each of said pins to bais the associated pin against the wall of the opening through which it extends.

6. In a power transmission mechanism, a shaft, a pair of axially spaced positive clutch elements coaxially rotatable independently of and axially fixed relative to said shaft, a complementary positive clutch element rotatably fixed upon and axially shiftable relative to said shaft intermediate said pair of axially fixed positive clutch elements, a frictional clutch element fixed upon each of said positive clutch elements, a pair of complementary frictional clutch members rigidly correlatively axially spaced and disposed between said fixed clutch elements, a plurality of pins symmetrically disposed about and parallel to the axis of said shaft and mounted for axial displacement with and transverse displacement relative to said pair of complementary frictional clutch members, means including at least one resilient element associated with each of said pins and so resiliently coupling said pins to said axially shiftable positive clutch element that initial axial displacement of said axially shiftable positive clutch element will produce conjoint axial displacement of said pins and said pair of spaced complementary frictional clutch members into engagement with one of said axially fixed frictional clutch elements and further axial displacement of said axially shiftable positive clutch element will produce transverse displacement of said pins to permit relative axial movement between said axially shiftable clutch element and said pair of spaced complementary frictional clutch elements to permit engagement of said axially shiftable positive clutch element with one of said axially fixed positive clutch elements associated with said one axially fixed frictional clutch element, and means so isolating said resilient elements from said clutch elements and members as to prevent damage to said clutch elements or members in event of breakage of any of said resilient elements.

7. In a power transmission mechanism, a pair of coaxially aligned independently rotatable positive clutch elements mounted in fixed spaced relation, a coaxially rotatable complementary positive clutch element mounted intermediate the clutch elements of said pair for axial movement into driving engagement with either element of said pair, a frictional clutch element fixed to each positive clutch element of said axially fixed pair, a complementary frictional clutch element supported upon said complementary positive clutch element and engageable with either of the frictional clutch elements associated with said axially fixed positive clutch elements, means coupling said complementary frictional clutch element to said complementary positive clutch element for initial conjoint axial displacement to engage said complementary frictional clutch element with one of said fixed frictional clutch elements and for subsequent independent axial movement of said complementary positive clutch element to engage the one of said axially fixed positive clutch elements associated with said one frictional clutch element, said means comprising a plurality of pins symmetrically disposed about and extending parallel to the axis of rotation of said complementary positive clutch element, said pins being axially fixed and transversely displaceable relative to said complementary frictional clutch element, coacting detent surfaces on said pins and said complementary positive clutch element, said surfaces being engaged while said pins are transversely displaced in one direction and disengaged while said pins are transversely displaced in the opposite direction, and resilient means reacting between said pins and said complementary frictional clutch element and biasing said pins in said one direction.

8. In a power transmission mechanism, a pair of coaxially aligned independently rotatable positive clutch elements mounted in fixed spaced relation, a coaxially rotatable complementary positive clutch element mounted intermediate the clutch elements of said pair for axial movement into driving engagement with either element of said pair, a frictional clutch element fixed to each positive clutch element of said axially fixed pair, a complementary frictional clutch element supported upon said complementary positive clutch element and engageable with either of the frictional clutch elements associated with said axially fixed positive clutch elements, means coupling said complementary frictional clutch element to said complementary positive clutch element for initial conjoint axial displacement to engage said complementary frictional clutch element with one of said fixed frictional clutch elements and for subsequent independent axial movement of said complementary positive clutch element to engage the one of said axially fixed positive clutch elements associated with said one frictional clutch element, said means comprising a plurality of pins symmetrically disposed about and extending parallel to the axis of rotation of said complementary positive clutch element, said pins being axially fixed and transversely displaceable in a radial direction relative to said complementary frictional clutch element, coacting detent surfaces formed on said pins and said complementary positive clutch element, said surfaces being engaged while said pins are radially displaced in one direction and disengaged while said pins are radially displaced in the opposite direction, and resilient means reacting between said pins and said complementary frictional clutch element and radially biasing said pins in said one direction.

9. In a power transmission mechanism, a pair of coaxially aligned independently rotatable positive clutch elements mounted in fixed spaced relation, a coaxially rotatable complementary positive clutch element mounted intermediate the clutch elements of said pair for axial movement into driving engagement with either element of said pair, a frictional clutch element fixed to each positive clutch element of said axially fixed pair, a complementary frictional clutch element supported upon said complementary positive clutch element and engageable with either of the frictional clutch elements associated with said axially fixed positive clutch elements, means coupling said complementary frictional clutch element to said complementary positive clutch element for initial conjoint axial displacement to engage said complementary frictional clutch element with one of said fixed frictional clutch elements and for subsequent axial movement of said complementary positive clutch element to engage the one of said axially fixed positive clutch elements associated with said one frictional clutch element, said means comprising a plurality of pins symmetrically disposed about and extending parallel to the axis of rotation of said complementary positive clutch element, and each formed with an axially extending through opening, said pins being axially fixed and transversely displaceable relative to said complementary frictional clutch element, coacting detent surfaces formed on said pins and said complementary positive clutch element, said surfaces being engaged while said pins are transversely displaced in one direction and disengaged while said pins are transversely displaced in the opposite direction, reaction surfaces formed on said complementary frictional clutch element at the ends of each of said pins, and resiliently biased means reacting between a wall of the through opening of each of said pins and said reaction surfaces on said complementary frictional clutch element to bias said pins in said one direction.

10. The combination defined in claim 9 wherein said resiliently biased means are bowed elongated spring members, each extending through the opening of one of said pins, reacting at their ends against said reaction surfaces on said complementary frictional clutch element and centrally of their lengths against a wall of the through opening of the associated pin.

11. The combination defined in claim 9 wherein said reaction surfaces are inclined from the ends of said pins and said resiliently biased means comprises a ball disposed within each end of and engaging a wall of the through openings of said pins and a resilient member within each of said openings compressed between said balls to bias said balls into engagement with said inclined reaction surfaces.

12. In a power transmission mechanism, a pair of coaxially aligned independently rotatable positive clutch elements mounted in fixed spaced relation, a coaxially rotatable complementary positive clutch element mounted intermediate the clutch elements of said pair for axial movement into driving engagement with either element of said pair, a frictional clutch element fixed to each positive clutch element of said axially fixed pair, a complementary frictional clutch element supported upon said complementary positive clutch element and engageable with either of the frictional clutch elements associated with said axially fixed positive clutch elements, means coupling said complementary frictional clutch element to said complementary positive clutch element for initial conjoint axial displacement to engage said complementary frictional clutch element with one of said fixed frictional clutch elements and for subsequent independent axial movement of said complementary positive clutch element to engage the one fo said axially fixed positive clutch elements associated with said one frictional clutch element, said means comprising a plurality of pins symmetrically disposed about and extending parallel to the axis of rotation of said complementary positive clutch element, said pins being axially fixed and transversely displaceable relative to said complementary frictional clutch element, coacting detent surfaces formed on said pins and said complementary positive clutch element, said surfaces being engaged while said pins are transversely displaced in one direction and disengaged while said pins are transversely displaced in the opposite direction, opposed reaction surfaces formed on each of said pins and on said complementary frictional clutch element at each end of each of said pins, and compressed resilient members reactively interposed between said opposed reaction surfaces to bias said pins in said one direction.

13. The combination defined by claim 12 wherein each of siad pins is exteriorly formed with a longitudinally extending slot, the reaction surfaces of said pins being formed by the end wall of said slots, said compressed resilient members being elongated spring members disposed within such slots and reacting between said slot end walls and said reaction surfaces at the end of said pins.

14. In a power transmission mechanism, a pair of coaxially aligned independently rotatable positive clutch elements mounted in fixed spaced relation, a coaxially rotatable complementary positive clutch element mounted intermediate the clutch elements of said pair for axial movement into driving engagement with either element of said pair, a frictional clutch element fixed to each positive clutch element of said axially fixed pair, a complementary frictional clutch element supported upon said complementary positive clutch element and engageable with either of the frictional clutch elements associated with said axially fixed positive clutch elements, means coupling said complementary frictional clutch element to said complementary positive clutch element for initial conjoint axial displacement to engage said complementary frictional clutch element with one of said fixed frictional clutch elements and for subsequent independent axial movement of said complementary positive clutch element to engage the one of said axially fixed positive clutch elements associated with said one frictional clutch element, said means comprising a plurality of pins symmetrically disposed about and extending parallel to the axis of rotation of said complementary positive clutch element, said pins being axially fixed and transversely displaceable relative to said complementary frictional clutch element, coacting detent surfaces formed on said pins and said complementary positive clutch element, said surfaces being engaged while said pins are transversely displaced in one direction and disengaged while said pins are transversely displaced in the opposite direction, an opposed pair of reaction surfaces formed on said pins and said complementary frictional clutch element at each end of said pins, and a resilient member compressed between each pair of opposed reaction surfaces at each end of said pins to resiliently bias said pins in said one direction.

15. In a power transmission mechanism, a pair of coaxially aligned independently rotatable positive clutch elements mounted in fixed spaced relation, a coaxially rotatable complementary positive clutch element mounted intermediate the clutch elements of said pair for axial movement into driving engagement with either element of said pair, a frictional clutch element fixed to each positive clutch element of said axially fixed pair, a complementary frictional clutch element supported upon said complementary positive clutch element and engageable with either of the frictional clutch elements associated with said axially fixed positive clutch elements, means coupling said complementary frictional clutch element to said complementary positive clutch element for initial conjoint axial displacement to engage said complementary frictional clutch element with one of said fixed frictional clutch eleemnts and for subsequent independent axial movement of said complementary positive clutch element to engage the one of said axially fixed positive clutch elements associated with said one frictional clutch element, said means comprising a plurality of longitudinally apertured exterior pins symmetrically disposed about and extending parallel to the axis of rotation of said complementary positive clutch element, said pins being axially fixed and transversely displaceable in a radial direction relative to said complementary frictional clutch element, coacting detent surfaces formed on said pins and said complementary positive clutch element, said surfaces being engaged while said pins are radially displaced in one direction and disengaged while said pins are radially displaced in the opposite direction, a longitudinally slotted interior pin of smaller cross section than and disposed within each of the longitudinal apertures of said apertured pins, and an elongated resilient member extending through the aperture of each exterior pin and through the slot of each interior pin and reacting between said pins and said complementary frictional clutch element and radially biasing said pins in said one direction.

16. In a power transmission mechanism, a pair of coaxially aligned independently rotatable positive clutch elements mounted in fixed spaced relation, a coaxially rotatable complementary positive clutch element mounted intermediate the clutch elements of said pair for axial movement into driving engagement with either element of said pair, a frictional clutch element fixed to each positive clutch element of said axially fixed pair, a complementary frictional clutch element supported upon said complementary positive clutch element and engageable with either of the frictional clutch elements associated with said axially fixed positive clutch elements, means coupling said complementary frictional clutch element to said complementary positive clutch element for initial conjoint axial displacement to engage said complementary frictional clutch element with one of said fixed frictional clutch elements and for subsequent axial movement of said complementary positive clutch element to engage the one of said axially fixed positive clutch elements associated with said one frictional clutch element, said means comprising a plurality of longitudinally apertured exterior pins symmetrically disposed about and extending parallel to the axis of rotation of said complementary positive element, a longitudinally slotted interior pin disposed within the longitudinal aperture of each said exterior pin, said exterior pins being axially fixed and transversely displaceable relative to said complementary frictional clutch element, coacting detent surfaces formed on said exterior pins and said complementary positive clutch element, said surfaces being engaged while said pins are transversely displaced in one direction and disengaged while said pins are transversely displaced in the opposite direction, reaction surfaces formed on said complementary frictional clutch element at the ends of each of said pins, and a resiliently biased member extending through the aperture of each said exterior pin and the slot of each associated interior pin and reacting between said pins and said reaction surfaces on said complementary frictional clutch element to bias said pins in said one direction.

17. In the mechanism defined in claim 6, said pins being hollow and said resilient elements comprising spring means contained substantially within said hollow pins so that broken spring fragments are prevented from damaging said mechanism.

18. In combination, a shaft, fixedly spaced toothed annular clutch elements coaxial with and rotatable independently of said shaft, a jaw clutch member slidable axially of said shaft between said clutch elements and having on opposite sides annular rows of teeth adapted to mesh with one or the other of said toothed clutch elements, friction clutch surfaces on said toothed clutch elements, a friction clutch member carried by said jaw clutch member and having at opposite sides friction clutch surfaces adapted to engage one or the other of said friction clutch surfaces on the toothed clutch elements, a plurality of axially rigid circumferentially spaced pins on said friction clutch member projecting freely axially through apertures in said jaw clutch member, at least some of said pins being transversely displaceable with respect to said friction clutch member, resilient means for biasing said pins to transversely displaced positions where they engage edges of said apertures in such relation as to interlock the friction and jaw clutch members together; means for axially moving said jaw clutch member, and means in the interlock between said members effective after synchronizing engagement of a coacting pair of said friction clutch surfaces when said jaw clutch is moved in either direction for overcoming said resilient bias to interrupt said interlock and permit further movement of said jaw clutch into mesh with one of said toothed clutch elements and means so isolating said resilient means from said clutch elements and members as to prevent damage to such clutch elements or members in the event of breakage of said resilient means.

19. In the combination defined in claim 18, said pins being hollow at at least the ends thereof and having their ends slidably engaging opposed faces on said friction clutch member, axially aligned sockets in said faces, and axially outwardly spring biased balls in the ends of said pins adapted to seat in said sockets when said pins are in said interlock position.

20. In a power transmission mechanism, a shaft, a pair of axially spaced positive clutch elements coaxially rotatable independently of and axially fixed relative to said shaft, a complementary positive clutch element rotatably fixed upon and axially shiftable relative to said shaft intermediate said pair of axially fixed positive clutch elements, a frictional clutch element fixed upon each of said positive clutch elements, a pair of complementary frictional clutch members rigidly correlatively axially spaced and disposed between said fixed clutch elements, a plurality of pins symmetrically disposed about and parallel to the axis of said shaft and mounted for axial displacement with and transverse displacement relative to said pair of complementary frictional clutch members, means so resiliently coupling said pins to said axially shiftable positive clutch element that initial axial displacement of said axially shiftable positive clutch element will produce conjoint axial displacement of said pins and said pair of spaced complementary frictional clutch members into engagement with one of said axially fixed frictional clutch members and further axial displacement of said axially shiftable positive clutch element will produce transverse displacement of said pins to permit relative axial movement between said axially shiftable clutch element and said pair of spaced complementary frictional clutch elements to permit engagement of said axially shiftable positive clutch element with one of said axially fixed positive clutch elements associated with said one axially fixed frictional clutch element, said pins being hollow and having their opposite ends slidably mounted in recesses in said complementary frictional clutch members, axially aligned inclined wall sockets at the bottoms of said recess, and said resilient coupling means comprising balls in the opposite ends of said hollow pins adapted to seat in said sockets in one transverse position of said pins, and spring means within said hollow pins axially outwardly biasing said balls.

21. In combination a shaft, fixedly spaced toothed annular clutch elements coaxial with and rotatable independently of said shaft, a jaw clutch member slidable axially of said shaft between said clutch elements and having on opposite sides annular rows of teeth adapted to mesh with one or the other of said toothed clutch elements, friction clutch surfaces on said toothed clutch elements, a friction clutch member carried by said jaw clutch member and having at opposite sides friction clutch surfaces adapted to engage one or the other of said friction clutch surfaces on the toothed clutch elements, a plurality of axially rigid circumferentially spaced pins on said friction clutch member projecting freely axially through apertures in said jaw clutch member, at least some of said pins being hollow and transversely displaceable with respect to said friction clutch member, resilient means contained mainly within said hollow pins for biasing said hollow pins to transversely displaced positions where they engage edges of said apertures in such relation as to interlock the friction and jaw clutch members together; means for axially moving said jaw clutch member, and means in the interlock between said members effective after synchronizing engagement of a coacting pair of said friction clutch surfaces when said jaw clutch is moved in either direction for overcoming said resilient bias to interrupt said interlock and permit further movement of said jaw clutch into mesh with one of said toothed clutch elements, said hollow pins having their ends slidably engaging the opposed faces on said friction clutch member, axially aligned sockets in said faces, an axially outwardly spring biased balls in said hollow pins adapted to seat in said sockets when said pins are in said interlock position.

References Cited in the file of this patent

UNITED STATES PATENTS

| 2,101,826 | Thompson | Dec. 7, 1937 |
| 2,483,841 | Peterson et al. | Oct. 4, 1949 |
| 2,573,613 | Schullze | Oct. 30, 1951 |
| 2,667,955 | Bixby | Feb. 2, 1954 |

FOREIGN PATENTS

| 633,031 | Germany | July 18, 1936 |
| 905,357 | France | Feb. 3, 1945 |

UNITED STATES PATENT OFFICE

CERTIFICATE OF CORRECTION

Patent No. 2,814,373

November 26, 1957

Leo A. Bixby

It is hereby certified that error appears in the printed specification of the above numbered patent requiring correction and that the said Letters Patent should read as corrected below.

Column 9, line 29, after "pins" insert --each--; line 39, for "bais" read --bias--; column 11, line 62, for "one fo" read --one of--; column 12, line 5, for "siad" read --said--; line 63, for "eleemnts" read --elements--; column 14, line 49, for "recess" read --recesses--.

Signed and sealed this 28th day of January 1958.

SEAL)
Attest:
KARL H. AXLINE

Attesting Officer

ROBERT C. WATSON
Commissioner of Patents